(12) United States Patent
Kwon et al.

(10) Patent No.: US 10,094,447 B2
(45) Date of Patent: Oct. 9, 2018

(54) PLANETARY GEAR TRAIN OF AUTOMATIC TRANSMISSION FOR VEHICLES

(71) Applicant: Hyundai Motor Company, Seoul (KR)

(72) Inventors: Hyun Sik Kwon, Seoul (KR); Seong Wook Hwang, Gunpo-si (KR); Woo Jin Chang, Suwon-si (KR); Wonmin Cho, Hwaseong-si (KR); Jae Chang Kook, Hwaseong-si (KR); Seongwook Ji, Ansan-si (KR)

(73) Assignee: Hyundai Motor Company, Seoul (KR)

( * ) Notice: Subject to any disclaimer, the term of this patent is extended or adjusted under 35 U.S.C. 154(b) by 225 days.

(21) Appl. No.: 15/146,795

(22) Filed: May 4, 2016

(65) Prior Publication Data

US 2017/0108086 A1    Apr. 20, 2017

(30) Foreign Application Priority Data

Oct. 15, 2015    (KR) ........................ 10-2015-0144301

(51) Int. Cl.
*F16H 3/66*    (2006.01)
*F16H 3/44*    (2006.01)

(52) U.S. Cl.
CPC ......... *F16H 3/66* (2013.01); *F16H 2003/445* (2013.01); *F16H 2200/006* (2013.01); *F16H 2200/201* (2013.01); *F16H 2200/2046* (2013.01); *F16H 2200/2097* (2013.01)

(58) Field of Classification Search
None
See application file for complete search history.

(56) References Cited

U.S. PATENT DOCUMENTS 7,736,259 B2 *   6/2010   Wittkopp .................. F16H 3/66
                                                          475/275
8,221,281 B2     7/2012   Wittkopp et al.

FOREIGN PATENT DOCUMENTS

JP    2012-229796 A    11/2012
JP       5221503 B2     6/2013
KR  10-2010-0108243 A  10/2010

\* cited by examiner

*Primary Examiner* — Jacob S. Scott
(74) *Attorney, Agent, or Firm* — Morgan, Lewis & Bockius LLP

(57) ABSTRACT

Eight or more forward speeds and at least one reverse speed is achieved by a planetary gear train of an automatic transmission for a vehicle including an input shaft, an output shaft, three planetary gear sets respectively having three rotation elements, and six control elements for selectively interconnecting the rotation elements.

7 Claims, 2 Drawing Sheets

FIG. 2

|      | C1 | C2 | C3 | C4 | C5 | B1 | Gear ratio |
|------|----|----|----|----|----|----|------------|
| D1   | ●  |    |    |    | ●  | ●  | 3.750      |
| D2   | ●  |    | ●  |    | ●  |    | 1.512      |
| D3   | ●  |    |    | ●  | ●  |    | 1.443      |
| D4   | ●  | ●  |    |    | ●  |    | 1.000      |
| D5   |    | ●  |    | ●  | ●  |    | 0.839      |
| D6   |    | ●  | ●  |    | ●  |    | 0.814      |
| D7   |    | ●  | ●  | ●  |    |    | 0.581      |
| D8   | ●  | ●  | ●  |    |    |    | 0.233      |
| REV  | ●  |    | ●  |    |    | ●  | -0.279     |

PLANETARY GEAR TRAIN OF AUTOMATIC TRANSMISSION FOR VEHICLES

CROSS-REFERENCE TO RELATED APPLICATION

The present application claims priority to and the benefit of Korean Patent Application No. 10-2015-0144301 filed on Oct. 15, 2015, the entire contents of which is incorporated herein for all purposes by this reference.

BACKGROUND OF THE INVENTION

Field of the Invention

The present invention relates to an automatic transmission for a vehicle. More particularly, the present invention relates to a planetary gear train of an automatic transmission of a vehicle that can improve power delivery performance and reduce fuel consumption by achieving eight forward speed stages using a minimum number of constituent elements.

Description of Related Art

In recent years, a rise in oil price has caused unlimited competition for enhancing fuel efficiency.

As a result, researches into reduction of weight and enhancement of fuel efficiency through down-sizing are being conducted in the case of an engine, and researches for simultaneously securing operability and fuel efficiency competitiveness through multistages are being conducted in the case of an automatic transmission.

However, in the automatic transmission, as a number of transmission stages increases, the number of internal components increases, and as a result, mountability, cost, weight, transmission efficiency, and the like may still deteriorate.

Accordingly, development of a planetary gear train which may bring about maximum efficiency with a small number of components may be important in order to increase a fuel efficiency enhancement effect through the multistages.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle having advantages of improving power delivery performance and fuel efficiency by achieving eight forward speed stages and one reverse speed stage using a driving point positioned at a low engine speed.

A planetary gear train of an automatic transmission for a vehicle according to an exemplary embodiment of the present invention may include: an input shaft receiving torque of an engine; an output shaft outputting changed torque; a first planetary gear set having first, second, and third rotational elements; a second planetary gear set having fourth, fifth, and sixth rotational elements; a third planetary gear set having seventh, eighth, and ninth rotational elements; a first rotation shaft including the first rotational element and ninth rotational element and selectively connectable to the input shaft; a second rotation shaft including the second rotational element and the fifth rotational element; a third rotation shaft including the third rotational element and selectively connectable to the input shaft or a transmission housing; a fourth rotation shaft including the fourth rotational element and selectively connectable to the first rotational element; a fifth rotation shaft including the sixth rotational element and directly connected to the transmission housing; a sixth rotation shaft including the seventh rotational element and selectively connectable to the second rotational element; and a seventh rotation shaft including the eighth rotational element and directly connected to the output shaft so as to selectively connectable to the fourth rotation shaft.

The first planetary gear set may be a single-pinion planetary gear set, in which the first rotation element may be a first sun gear, the second rotation element may be a first planet carrier, and the third rotation element may be a first ring gear, the second planetary gear set may be a single-pinion planetary gear set, in which the fourth rotation element may be a second sun gear, the fifth rotation element may be a second planet carrier, and the sixth rotation element may be a second ring gear, and the third planetary gear set may be a single-pinion planetary gear set, in which the seventh rotation element may be a third sun gear, the eighth rotation element may be a third planet carrier, and the ninth rotation element may be a third ring gear.

The planetary gear train may further include: a first clutch that selectively connects the input shaft and first rotation shaft; a second clutch that selectively connects the input shaft and the third rotation shaft; a third clutch that selectively connects the fourth rotation shaft and the seventh rotation shaft; a fourth clutch that selectively connects the first rotation shaft and the fourth rotation shaft; a fifth clutch that selectively connects the second rotation shaft and the sixth rotation shaft; and a first brake that selectively connects the third rotation shaft and the transmission housing.

A first forward speed stage may be achieved by operation of the first and fifth clutches and the first brake, a second forward speed stage may be achieved by operation of the first, third, and fifth clutches, a third forward speed stage may be achieved by operation of the first, fourth, and fifth clutches, a fourth forward speed stage may be achieved by operation of the first, second, and fifth clutches, a fifth forward speed stage may be achieved by operation of the second, fourth, and fifth clutches, a sixth forward speed stage may be achieved by operation of the second, third, and fifth clutches, a seventh forward speed stage may be achieved by operation of the second, third, and fourth clutches, an eighth forward speed stage may be achieved by operation of the first, second, and third clutches, and a reverse speed stage may be achieved by operation of the first and third clutches and the first brake.

An exemplary embodiment of the present invention may achieve eight forward speed stages and one reverse speed stage by combining three planetary gear sets with six friction elements. Therefore, power delivery performance and fuel efficiency may be improved.

Since a speed stage suitable for an engine speed can be achieved due to multiple speed stages, silent driving may be improved.

Since engine driving efficiency can be achieved due to multiple speed stages, power delivery performance and fuel efficiency may be improved.

Further, effects that can be obtained or expected from exemplary embodiments of the present invention are directly or suggestively described in the following detailed description. That is, various effects expected from exemplary embodiments of the present invention will be described in the following detailed description.

The methods and apparatuses of the present invention have other features and advantages which will be apparent

BRIEF DESCRIPTION OF THE DRAWINGS

FIG. 2 is a table representing operations at respective gear shift stages implemented by respective friction elements applied to the planetary gear train according to the exemplary embodiment of the present invention.

Figure 1:
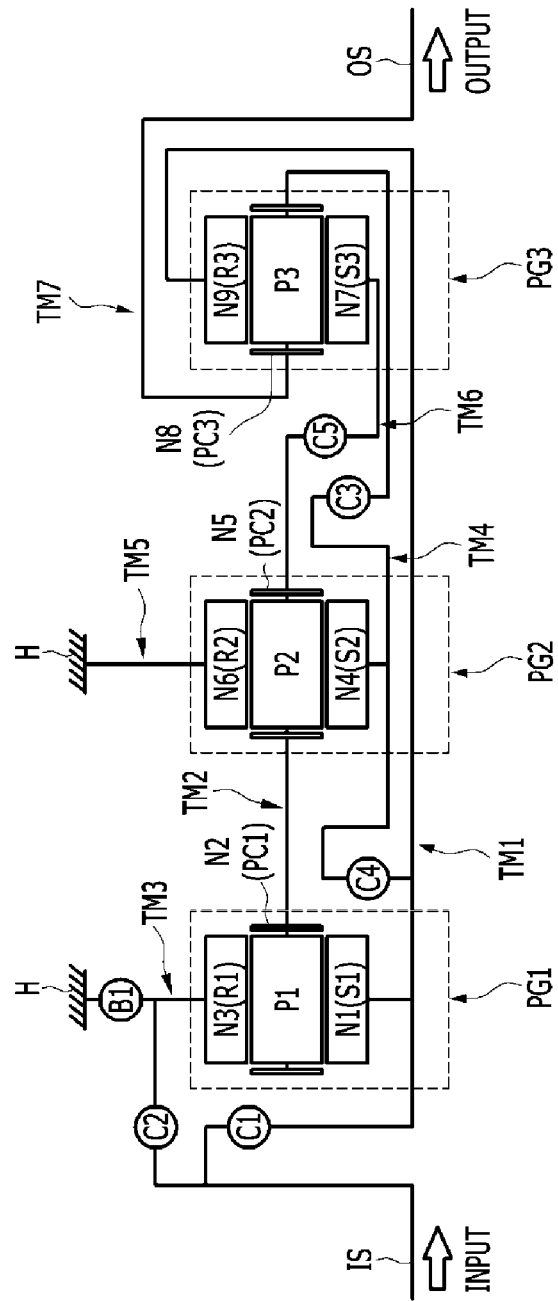
FIG. 1 is a configuration diagram of a planetary gear train according to a first exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention will be described more fully hereinafter with reference to the accompanying drawings, in which exemplary embodiments of the invention are illustrated. As those skilled in the art would realize, the described embodiments may be modified in various different ways, all without departing from the spirit or scope of the present invention.

Components unrelated to the description will be omitted in order to obviously describe the present invention, and like reference numerals will be used to describe like components throughout the present specification.

In the following description, dividing names of components into first, second, and the like is to divide the names because the names of the components are the same as each other, and an order thereof is not particularly limited.

FIG. 1 is a configuration diagram of a planetary gear train according to a first exemplary embodiment of the present invention.

Referring to FIG. 1, a planetary gear train according to an exemplary embodiment of the present invention includes first, second, and third planetary gear sets PG1, PG2, and PG3 disposed on the same axis, an input shaft IS, an output shaft OS, seven rotation shafts TM1 to TM7 including at least one of rotation elements of the first, second, and third planetary gear sets PG1, PG2, and PG3, six friction elements C1 to C5, and B1, and a transmission housing H.

As a result, torque input from the input shaft IS is changed by cooperation of the first, second, and third planetary gear sets PG1, PG2, and PG3, and the changed torque is output through the output shaft OS.

The planetary gear sets PG1, PG2, and PG3 are disposed sequentially from an engine side.

The input shaft IS is an input member, and power from a crankshaft of an engine is torque-converted through a torque converter to be input into the input shaft IS.

The output shaft OS is an output member, is disposed in parallel with the input shaft IS, and transmits driving torque to a driving wheel through a differential apparatus.

The first planetary gear set PG1 as a single-pinion planetary gear set includes a first sun gear S1 which is a first rotation element N1, a first planetary carrier PC1 which is a second rotation element N2 that supports a first pinion P1 which outer-engages with the first sun gear S1 which is the first rotation element N1, and a first ring gear R1 which is a third rotation element N3 which inner-engages with the first pinion P1 as rotation elements.

The second planetary gear set PG2 as a single-pinion planetary gear set includes a second sun gear S2 which is a fourth rotation element N4, a second planet carrier PC2 which is a fifth rotation element N5 that supports a second pinion P2 which outer-engages with the second sun gear S2 which is the fourth rotation element N4, and a second ring gear R2 which is a sixth rotation element N6 which inner-engages with the second pinion P2 as rotation elements.

The third planetary gear set PG3 as a single-pinion planetary gear set includes a third sun gear S3 which is a seventh rotation element N7, a third planet carrier PC3 which is an eighth rotation element N8 that supports a third pinion P3 which outer-engages with the third sun gear S3 which is the seventh rotation element N7, and a third ring gear R3 which is a ninth rotation element N9 which inner-engages with the third pinion P3 as the rotation elements.

In the first, second, and third planetary gear set PG1, PG2, and PG3, the first rotational element N1 is directly connected to the ninth rotational element N9 so as to be operated with a total of seven rotation shafts TM1 to TM7.

Configurations of the seven rotation shafts TM1 to TM8 will be described below.

The first rotation shaft TM1 includes the first rotational element N1 (the first sun gear S1) and is selectively connectable to the ninth rotational element N9 (the third ring gear R3).

The second rotation shaft TM2 includes the second rotational element N2 (the first planet carriers PC1) and the second rotational element N2 (the second planet carrier PC2).

The third rotation shaft TM3 includes the third rotational element N3 (the first ring gear R1) and is selectively connectable to the input shaft IS or the transmission housing H.

The fourth rotation shaft TM4 includes the fourth rotational element N4 (the second sun gear S2) and is selectively connectable to the first rotation shaft TM1.

The fifth rotation shaft TM5 includes the sixth rotational element N6 (the second ring gear R2) and is directly connected to the transmission housing H.

The sixth rotation shaft TM6 includes the seventh rotational element N7 (the third sun gear S3) and is selectively connectable to the second rotation shaft TM2.

The seventh rotation shaft TM7 includes the eighth rotational element N8 (the third planet carrier PC3) and is directly connected to the output shaft OS, and is selectively connectable to the fourth rotation shaft TM4.

In addition, among the rotation shafts TM1 to TM7, five clutches C1, C2, C3, C4, and C5 which are friction elements are disposed at connection portions where the rotation shafts are connected to each other.

In addition, among the rotation shafts TM1 to TM7, one brake B1 which is friction element is disposed at connection portions between any one rotation shaft and the transmission housing H.

The six friction elements C1 to C5, and B1 will now be described in further detail.

The first clutch C1 is interposed between the input shaft IS and the first rotation shaft TM1 and selectively connects the input shaft IS and the first rotation shaft TM1.

The second clutch C2 is interposed between the input shaft IS and the third rotation shaft TM3 and selectively connects the input shaft IS and the third rotation shaft TM3.

The third clutch C3 is interposed between the fourth rotation shaft TM4 and the seventh rotation shaft TM7 and selectively connects the fourth rotation shaft TM4 and the seventh rotation shaft TM7.

The fourth clutch C4 is interposed between the first rotation shaft TM1 and the fourth rotation shaft TM4 and selectively connects the first rotation shaft TM1 and the fourth rotation shaft TM4.

The fifth clutch C5 is interposed between the second rotation shaft TM2 and the sixth rotation shaft TM6 and selectively connects the second rotation shaft TM2 and the sixth rotation shaft TM6.

The first brake B1 is interposed between the third rotation shaft TM3 and the transmission housing H and causes the third rotation shaft TM3 to be operated as a selective fixed element.

The friction elements including the first, second, third, fourth, and clutches C1, C2, C3, C4, and C5 and the first brake B1 may be multi-plates friction elements of a wet type that are operated by hydraulic pressure.

FIG. 2 is a table representing operations at respective gear shift stages implemented by respective friction elements applied to the planetary gear train according to the exemplary embodiment of the present invention.

As shown in FIG. 2, three friction elements are operated at each speed stage in the planetary gear train according to an exemplary embodiment of the present invention.

The first and fifth clutches C1 and C5 and the first brake B1 are operated at a first forward speed stage D1. In a state that the input shaft IS is connected to the first rotation shaft TM1, and the second rotation shaft TM2 is connected to the sixth rotation shaft TM6, rotation speed of the input shaft IS is input to the first rotation shaft TM1, and the fifth rotation shaft TM5 and the third rotation shaft TM3 are operated as the fixed elements. Therefore, the first forward speed stage is achieved.

The first, third, and fifth clutches C1, C3, and C5 are operated at a second forward speed stage D2. In a state that the input shaft IS is connected to the first rotation shaft TM1, the fourth rotation shaft TM4 is connected to the seventh rotation shaft TM7, and the second rotation shaft TM2 is connected to the sixth rotation shaft TM6, rotation speed of the input shaft IS is input to the first rotation shaft TM1, and the fifth rotation shaft TM5 is operated as the fixed element. Therefore, the second forward speed stage is achieved.

The first, fourth, and fifth clutches C1, C4, and C5 are operated at a third forward speed stage D3. In a state that the input shaft IS is connected to the first rotation shaft TM1, the first rotation shaft TM1 is connected to the fourth rotation shaft TM4, and the second rotation shaft TM2 is connected to the sixth rotation shaft TM6, rotation speed of the input shaft IS is input to the first rotation shaft TM1, and the fifth rotation shaft TM5 is operated as the fixed element. Therefore, the third forward speed stage is achieved.

The first, second, and fifth clutches C1, C2, and C5 are operated at a fourth forward speed stage D4. In a state that the input shaft IS is connected to the first rotation shaft TM1, the input shaft IS is connected to the third rotation shaft TM3, and the second rotation shaft TM2 is connected to the sixth rotation shaft TM6, rotation speed of the input shaft IS is input to the first rotation shaft TM1 and the third rotation shaft TM3, and the fifth rotation shaft TM5 is operated as the fixed element. Therefore, the fourth forward speed stage is achieved.

The second, fourth, and fifth clutches C2, C4, and C5 are operated at a fifth forward speed stage D5. In a state that the input shaft IS is connected to the third rotation shaft TM3, the first rotation shaft TM1 is connected to the fourth rotation shaft TM4, and the second rotation shaft TM2 is connected to the sixth rotation shaft TM6, rotation speed of the input shaft IS is input to the first rotation shaft TM1 and the third rotation shaft TM3, and the fifth rotation shaft TM5 is operated as the fixed element. Therefore, the fifth forward speed stage is achieved.

The second, third, and fifth clutches C2, C3, and C5 are operated at a sixth forward speed stage D6. In a state that the input shaft IS is connected to the third rotation shaft TM3, the fourth rotation shaft TM4 is connected to the seventh rotation shaft TM7, and the second rotation shaft TM2 is connected to the sixth rotation shaft TM6, rotation speed of the input shaft IS is input to the third rotation shaft TM3, and the fifth rotation shaft TM5 is operated as the fixed element. Therefore, the sixth forward speed stage is achieved.

The second, third, and fourth clutches C2, C3, and C4 are operated at a seventh forward speed stage D7. In a state that the input shaft IS is connected to the third rotation shaft TM3, the fourth rotation shaft TM4 is connected to the seventh rotation shaft TM7, and the first rotation shaft TM1 is connected to the fourth rotation shaft TM4, rotation speed of the input shaft IS is input to the third rotation shaft TM3, and the fifth rotation shaft TM5 is operated as the fixed element. Therefore, the seventh forward speed stage is achieved.

The first, second, and third clutches C1, C2, and C3 are operated at an eighth forward speed stage D8. In a state that the input shaft IS is connected to the first rotation shaft TM1, the input shaft IS is connected to the third rotation shaft TM3, and the fourth rotation shaft TM4 is connected to the seventh rotation shaft TM7, rotation speed of the input shaft IS is input to the first rotation shaft TM1 and the third rotation shaft TM3, and the fifth rotation shaft TM5 is operated as the fixed element. Therefore, the eighth forward speed stage is achieved.

The first and third clutches C1 and C3 and the first brake B1 are operated at a reverse speed stage REV 1. In a state that the input shaft IS is connected to the first rotation shaft TM1, and the fourth input shaft TM4 is connected to the third rotation shaft TM3, rotation speed of the input shaft IS is input to the first rotation shaft TM1, and the fifth rotation shaft TM5, the third rotation shaft TM3, and the first brake B1 are operated as the fixed elements. Therefore, the reverse speed stage is achieved.

The planetary gear train according to an exemplary embodiment of the present invention may achieve eight forward speed stages and one reverse speed stage by control of three planetary gear sets PG1, PG2, and PG3 with five clutches C1, C2, C3, C4, and C5, and one brake B1.

Since a speed stage suitable for an engine speed can be achieved due to multiple speed stages, silent driving may be improved.

Since engine driving efficiency can be achieved due to multiple speed stages, power delivery performance and fuel efficiency may be improved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
   an input shaft receiving torque of an engine;
   an output shaft outputting changed torque;
   a first planetary gear set having first, second, and third rotation elements;
   a second planetary gear set having fourth, fifth, and sixth rotation elements;
   a third planetary gear set having seventh, eighth, and ninth rotation elements;
   a first rotation shaft including the first rotation element and the ninth rotation element and selectively connectable to the input shaft;
   a second rotation shaft including the second rotation element and the fifth rotation element;
   a third rotation shaft including the third rotation element and selectively connectable to the input shaft or a transmission housing;
   a fourth rotation shaft including the fourth rotation element and selectively connectable to the first rotation element;
   a fifth rotation shaft including the sixth rotation element and directly connected to the transmission housing;
   a sixth rotation shaft including the seventh rotation element and selectively connectable to the second rotation element; and
   a seventh rotation shaft including the eighth rotation element and directly connected to the output shaft to be selectively connectable to the fourth rotation shaft.

2. The planetary gear train of claim 1, wherein
   the first planetary gear set is a single-pinion planetary gear set, in which the first rotation element is a first sun gear, the second rotation element is a first planet carrier, and the third rotation element is a first ring gear,
   the second planetary gear set is a single-pinion planetary gear set, in which the fourth rotation element is a second sun gear, the fifth rotation element is a second planet carrier, and the sixth rotation element is a second ring gear, and
   the third planetary gear set is a single-pinion planetary gear set, in which the seventh rotation element is a third sun gear, the eighth rotation element is a third planet carrier, and the ninth rotation element is a third ring gear.

3. The planetary gear train of claim 1, further comprising:
   a first clutch that selectively connects the input shaft and first rotation shaft;
   a second clutch that selectively connects the input shaft and the third rotation shaft;
   a third clutch that selectively connects the fourth rotation shaft and the seventh rotation shaft;
   a fourth clutch that selectively connects the first rotation shaft and the fourth rotation shaft;
   a fifth clutch that selectively connects the second rotation shaft and the sixth rotation shaft; and
   a first brake that selectively connects the third rotation shaft and the transmission housing.

4. The planetary gear train of claim 3, wherein
   a first forward speed stage is achieved by operation of the first and fifth clutches and the first brake,
   a second forward speed stage is achieved by operation of the first, third, and fifth clutches,
   a third forward speed stage is achieved by operation of the first, fourth, and fifth clutches,
   a fourth forward speed stage is achieved by operation of the first, second, and fifth clutches,
   a fifth forward speed stage is achieved by operation of the second, fourth, and fifth clutches,
   a sixth forward speed stage is achieved by operation of the second, third, and fifth clutches,
   a seventh forward speed stage is achieved by operation of the second, third, and fourth clutches,
   an eighth forward speed stage is achieved by operation of the first, second, and third clutches, and
   a reverse speed stage is achieved by operation of the first and third clutches and the first brake.

5. A planetary gear train of an automatic transmission for a vehicle, comprising:
   an input shaft receiving torque of an engine;
   an output shaft outputting changed torque;
   a first planetary gear set that is a single-pinion planetary gear set and includes a first sun gear, a first planet carrier, and a first ring gear;
   a second planetary gear set that is a single-pinion planetary gear set and includes a second sun gear, a second planet carrier, and a second ring gear;
   a third planetary gear set that is a single-pinion planetary gear set, and includes a third sun gear, a third planet carrier, and a third ring gear;
   a first rotation shaft including the first sun gear and the third ring gear and selectively connectable to the input shaft;
   a second rotation shaft including the first planet carrier and the second planet carrier;
   a third rotation shaft including the first ring gear and selectively connectable to the input shaft and a transmission housing;
   a fourth rotation shaft including the second sun gear and selectively connectable to the first rotation shaft;
   a fifth rotation shaft including the second ring gear and directly connected to the transmission housing;
   a sixth rotation shaft including the third sun gear and selectively connectable to the second rotation shaft; and
   a seventh rotation shaft including the third planet carrier and selectively connected to the fourth rotation shaft, and directly connected to the output shaft.

6. The planetary gear train of claim 5, further comprising:
a first clutch that selectively connects the input shaft and first rotation shaft;
a second clutch that selectively connects the input shaft and the third rotation shaft;
a third clutch that selectively connects the fourth rotation shaft and the seventh rotation shaft;
a fourth clutch that selectively connects the first rotation shaft and the fourth rotation shaft;
a fifth clutch that selectively connects the second rotation shaft and the sixth rotation shaft; and
a first brake that selectively connects the third rotation shaft and the transmission housing.

7. The planetary gear train of claim 6, wherein
a first forward speed stage is achieved by operation of the first and fifth clutches and the first brake,
a second forward speed stage is achieved by operation of the first, third, and fifth clutches,
a third forward speed stage is achieved by operation of the first, fourth, and fifth clutches,
a fourth forward speed stage is achieved by operation of the first, second, and fifth clutches,
a fifth forward speed stage is achieved by operation of the second, fourth, and fifth clutches,
a sixth forward speed stage is achieved by operation of the second, third, and fifth clutches,
a seventh forward speed stage is achieved by operation of the second, third, and fourth clutches,
an eighth forward speed stage is achieved by operation of the first, second, and third clutches, and
a reverse speed stage is achieved by operation of the first and third clutches and the first brake.

\* \* \* \* \*